United States Patent [19]

Eychenne et al.

[11] Patent Number: 5,483,520
[45] Date of Patent: Jan. 9, 1996

[54] METHOD OF BROADCASTING DATA BY MEANS OF A DATA TRAIN

[75] Inventors: Yves Eychenne, Limours; Michel Simatic, Evry, both of France

[73] Assignee: Cegelec, Levallois Perret, France

[21] Appl. No.: 326,202

[22] Filed: Oct. 20, 1994

[30] Foreign Application Priority Data

Oct. 22, 1993 [FR] France .................................... 93 12660

[51] Int. Cl.⁶ ................................................ H04L 12/437
[52] U.S. Cl. .................... 370/16.1; 370/85.5; 370/85.15; 395/181
[58] Field of Search ................................ 370/16.1, 85.5, 370/85.12, 85.15; 371/11.1, 11.2

[56] References Cited

U.S. PATENT DOCUMENTS

| | | | |
|---|---|---|---|
| 4,709,365 | 11/1987 | Beale et al. | 371/11.2 |
| 5,003,533 | 3/1991 | Watanabe | 370/85.5 |
| 5,283,783 | 2/1994 | Nguyen et al. | 370/16.1 |

FOREIGN PATENT DOCUMENTS

0280231A3  8/1988  European Pat. Off. ........ H04L 11/16

OTHER PUBLICATIONS

R. Abraham et al, "Data Loop Architecture Using Transmit–Receive Message Pairs", *IBM Technical Disclosure Bulletin*, vol. 19, No. 1 Jun. 1976, pp. 146–151.
French Search Report FR 9312660.

Primary Examiner—Douglas W. Olms
Assistant Examiner—Russell W. Blum
Attorney, Agent, or Firm—Sughrue, Mion, Zinn, Macpeak & Seas

[57] ABSTRACT

A method of transmitting data between a set of data processing nodes interconnected by a communications network. Each node broadcasts data to the other nodes by causing a train of such data to travel over the network around a looped circuit or "ring" passing through each of said nodes, each node in the ring having a predecessor and a successor. A counter is provided in the data train, and on receiving a data train sent by its predecessor, each node recovers the counter from the received data train, increments the counter, and dispatches to its successor a new data train including the counter as incremented. It also stores the new data train with the incremented counter in its memory so that it is possible to implement a simple fault recovery procedure in the event of one of the nodes becoming faulty.

2 Claims, 3 Drawing Sheets

METHOD OF BROADCASTING DATA BY MEANS OF A DATA TRAIN

FIELD OF THE INVENTION

The invention relates to a method of transmitting data for a set of data processing nodes that are interconnected by a communications network and for the purpose of broadcasting data from each node to the other nodes by causing a train of such data to travel over the network around a looped circuit or "ring" that passes through said data processing nodes in succession in such a manner that each node in turn recovers, removes, and writes data in the train, each node having a predecessor and a successor on the ring and being capable of detecting a faulty state of its successor or of its predecessor.

BACKGROUND OF THE INVENTION

Such a method is known from the document "IBM Technical Disclosure Bulletin", Vol. 33, No. 9, February 1991.

It is designed firstly for reliable and ordered broadcasting of data shared between replicated modules of a data processing system, with each module constituting a node for processing such data.

In the known method, each node connected to the communications network and receiving a data train recovers the data contained in the train in the order the data was inserted therein by the other nodes during the most recent trip of the data train round the ring. The node then makes up a new data train by eliminating from the data train any data that it itself inserted in the train on its preceding trip round the ring, and by adding new data to the tail end of the train. Thereafter, the node sends the new data train over the network for broadcasting to the other nodes as the train makes a trip round the ring. It should be observed that the train may circulate empty when none of the nodes has any data to broadcast.

In such a data processing system, one or more nodes may be subject to faulty operation or to failure causing them to be disconnected from the network. It is nevertheless essential to ensure that the system continues to operate with those nodes that are still operational, by implementing a fault recovery procedure, particularly if the data train has stopped in a faulty node.

OBJECT AND SUMMARY OF THE INVENTION

The object of the invention is to propose a simple solution to that problem.

The problem is solved by the method of claim 1.

In that method, a procedure is provided in each node for detecting a faulty or non-faulty state of the node preceding the node in question on the ring followed by the train. The fault recovery procedure is distributed, i.e. it resides at the level of each of the nodes that remains operational. In the event of fault recovery, any data train that has become obsolete given that it is already present in the internal memory of a node connected to the network is eliminated from the ring by the nodes that remain in operation. When a node becomes faulty, the functioning predecessor of the faulty node applies to the network the data train that it has most recently recorded in its internal memory so that reliable and ordered broadcasting of the data is recommenced rapidly.

BRIEF DESCRIPTION OF THE DRAWINGS

The invention is now described in detail with reference to the drawings.

MORE DETAILED DESCRIPTION

Figure 1:
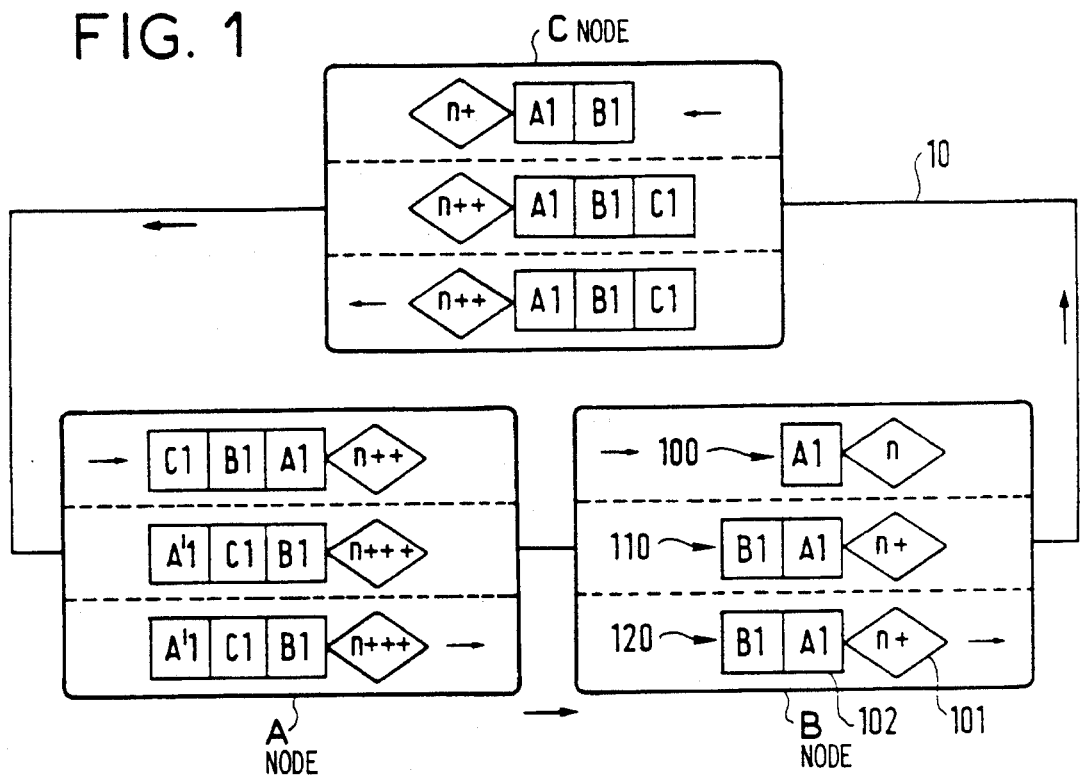
FIG. 1 shows the operation of a data train in association with three nodes.

In FIG. 1, nodes A, B, and C are interconnected point-to-point by a communications network 10, e.g. the "Ethernet" system (or any implementation of the standard ISO 802.3) under the control of the transport layer or transmission control protocol (TCP).

These nodes are replicated modules of a complex data processing system of redundant architecture. In the present case, the modules may reside in different processors interconnected in the network.

The transport layer or "TCP" is reliable in the sense that a node sends data to another node over the network in a manner that is reliable and with the data remaining in chronological order.

Each node broadcasts its own data to the other nodes by means of a data train which travels round the network from node to node following a looped circuit or "ring" in the direction shown by the arrows. The ring passes successively via the nodes in the order A, B, C, A, ... and so on. The ring is built up as and when nodes are inserted therein.

In FIG. 1, each node is represented by a rectangle subdivided into three portions corresponding respectively to the functions of receiving, handling, and transmitting the data train. Thus, overall each node receives from the network 10 the data train given reference 100, makes up a new data train given reference 110, stores the new data train in memory, and dispatches the new data train given reference 120 over the network.

A data train is made up of a header 101 and of one or more "cars" 102.

The header 101 contains a counter, the length of the train (as a number of bytes) and a description table listing the nodes making up the ring for the train. In the table, the nodes are given codes which are ordered as a function of the order the train visits the nodes such that each node is capable, by consulting the table contained in a data train that it has received, of determining which node follows it or precedes it on the ring. In FIG. 1, only the counter n is shown in the header 101 of the train.

Each car 102 contains a code identifying a car-user node, the length of the car in bytes, and data inserted in the car by the car-user node in question. In FIG. 1, the cars are shown as containing respective single data items A1, B1, C1, A'1. Each data item is designated herein by a letter that specifies the node which put it on the train.

Normal operation of the train is now described. The nodes A, B, and C form a portion of the ring, with the most recent data train to be dispatched to the network shown leaving node A.

At this stage, node B receives a data train 100 that has a header 101 containing the counter n and a car 102 containing the data A1 put on the train by node A.

Node B recovers data item A1 from the train 100. It increments the counter n (n+) in the header 101 of the train. In this case the value of the increment is selected to be one. Node B makes up and stores a new train 110 in memory, which train comprises a header containing the counter incremented by one (n+), the car containing the data item A1, and a new car containing a data item B1. The car containing a data item B1 is added to the tail end of the train. Thereafter, node B sends a train 120 over the network to node C, where the train 120 is identical to the train most recently stored in memory (train 110). It should be understood that on each round trip of the train, node B updates the contents of its memory with the most recent data train that it has dispatched to the network.

Node C now receives the data train sent by node B. It recovers data items A1 and B1 from the cars of the train. It increments the counter of the train it received (n++). It makes up and stores in its memory a new train that comprises a header containing the counter as incremented by one (n++), plus three cars containing respectively and in that order data items A1, B1, and C1. It sends this new data train to node A. In the event of node C having no data to broadcast, the third car could be left empty or it need not be added to the end of the train. In the present invention, that constitutes a design choice.

Node A now receives the most recent train to be dispatched over the network. It recovers the data items A1, B1, and C1. It increments the train counter (n+++). It removes from the train the car containing its own data item A1 that it had put on the train on the preceding round trip. The node A makes up a new train by adding to the end of the train a car containing a new data item A'1, and it stores this new train in memory. The new train contains the new counter (n+++) and three cars containing respectively and in order data items B1, C1, A'1. Node A then dispatches the new train over the network.

At this stage, each node has in its memory the state of the train which it dispatched to the network on the previous round trip of the train.

Also, each node recovers, the data broadcast by the other nodes, in turn and in an order that corresponds to the order the data was put on the train, thereby ensuring that data is broadcast in orderly manner.

Figure 5:
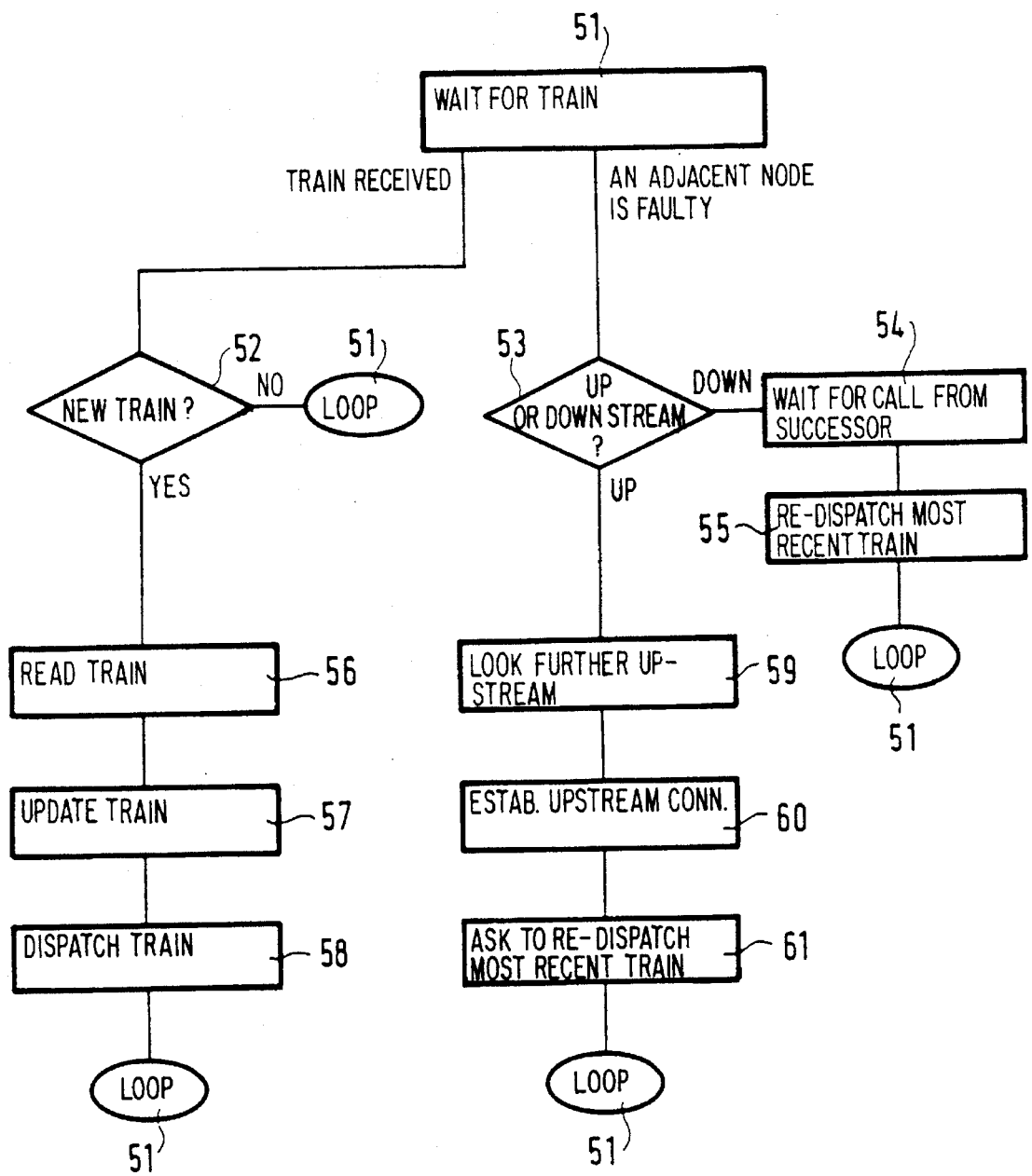
FIG. 5 is a flow chart showing the fault recovery process implemented by the nodes that remain in operation.

With reference to FIG. 5, the fault recovery process is as follows.

At 51, a functioning node is waiting to receive a train 120 of data coming from its predecessor.

In response to receiving a data train, the node compares, at 52, the counter of the received train 100 with the counter of the last train 110 stored in its memory. If the counter of the received train is smaller than the counter of the train stored in memory, the node detects that the received data train is obsolete and it restarts processing from step 51. Otherwise, in step 56, the node recovers the data from the train, and in step 57 it increments the train counter, puts new data on the train, and stores the new train in memory. Then, in step 58, it dispatches the train to its successor over the network and then returns to step 51.

While a functioning node is waiting to receive a data train, the functioning node takes account, where appropriate, of its predecessor being in a faulty state, thereby triggering a fault recovery procedure. Detection is based on receiving a first network message (a state message) sent by the transport layer when one of the read requests regularly addressed by a functioning node to its (faulty) predecessor remains unanswered.

When the transport layer detects failure of a node, it generates a state message at the predecessor and at the successor of the faulty node.

At 53, the predecessor and the successor receive this state message. Each then determines whether the link it has lost came from its predecessor or from to its successor, thereby enabling each of these nodes to determine whether it is the successor or the predecessor of a faulty node.

If the node which has received the state message is the predecessor of a faulty node, it waits in step 54 for a connection request from the successor of the faulty node.

If the node that has received the state is the successor of the faulty node, it attempts to reconnect itself to the faulty node in order to make sure that it is merely a temporary loss of the communications link and not a failure of the node.

Consequently, if the functioning node determines at 53 that it is the predecessor of a faulty node, it waits at 54 for a "TCP" connection request coming from the successor of the faulty node via the transport protocol. If the functioning node determines at 53 that it is the successor of the faulty node, then it begins by attempting to make connection with the faulty node. In the event of failure, at 59 it looks for a new predecessor in the table of nodes that it retains from the last data train 110 stored in its memory. This new predecessor node is defined as being the first functioning predecessor to the faulty node on the ring trip of the train. At 60, it establishes a connection with the new predecessor node via the transport layer. The connection which is in the form of a second network message (a connection message) may succeed in the event that the new predecessor is functional or it may fail in the event that the new predecessor is itself faulty. In the event of failure, the functional node under consideration is designed to work its way back through the various nodes on the ring of the train until it establishes a satisfactory connection with a functioning predecessor.

In response to the connection being established between the successor of a faulty node and the predecessor of the faulty node, the predecessor at step 55 applies to the network the train 110 most recently stored in its memory, and then returns to step 51.

In the event of a node failing, the ring of the train can be updated as follows.

In step 56, each node is designed to test the state of an internal Boolean variable. If the Boolean variable is "true", then the node updates the table describing the ring travelled by the train in the most recent data train that it has stored in its memory. This is done by eliminating the code for the faulty node. The cars containing data from the faulty node are not retained in the train stored in memory. Thereafter it sets the test variable to "false". In the event that the test variable is "false", then the node performs no further treatment in step 56. Naturally, the test variables of the nodes are set to "false" when the system begins to operate.

Furthermore, each node is designed, in step 55, to update the description table of the train applied to the network and to purge the train of data relating to the faulty node.

The predecessor of a faulty node now sets its internal test variable to "true" in step 55 either after or before dispatching the most recent train of data stored in its memory and updated as described above.

In this way, the successor of the faulty node always receives from the predecessor of the faulty node a data train having an updated train ring. Also, the data train sent over the network by any of the successor nodes to the faulty node is filtered once only in step 56 by the predecessor to the faulty node for the purposes of updating the description table of the train ring and of eliminating the data that came from the faulty node.

An example of how the fault recovery process operates is now described with reference to FIGS. 2 to 4.

Figure 2:
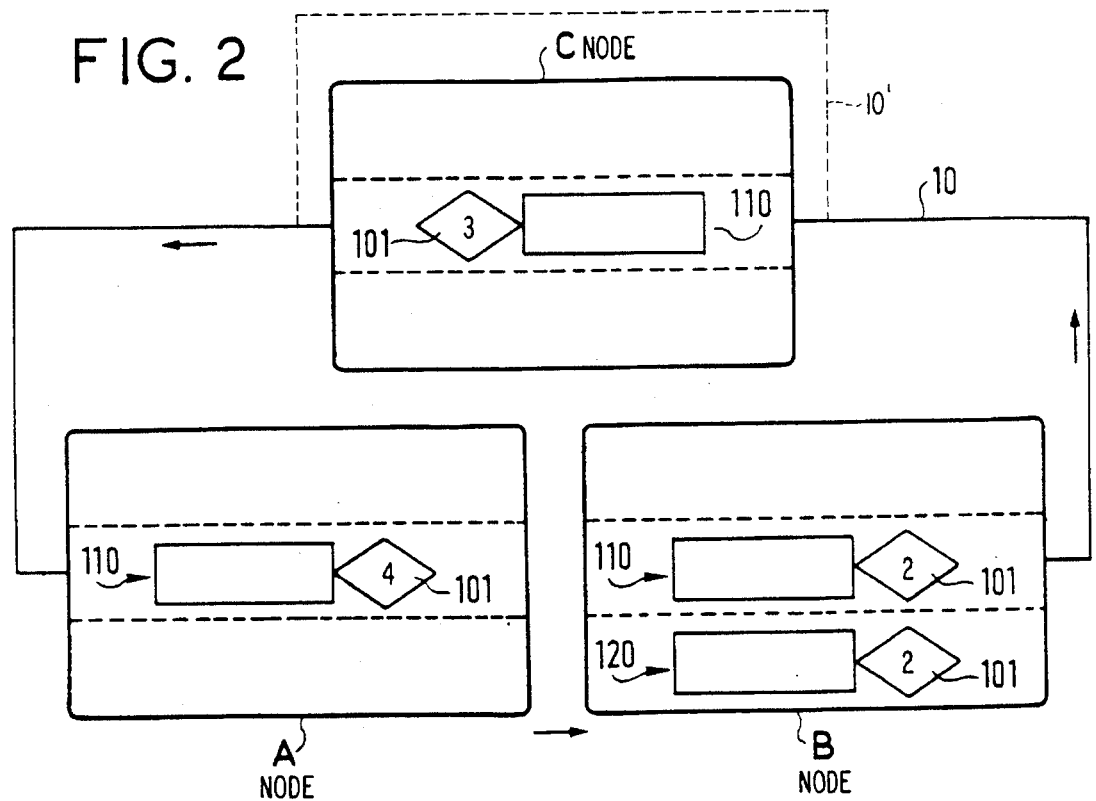
FIGS. 2 to 4 show the operation of the data train in the event of one of the nodes in FIG. 1 being faulty.

In FIG. 2, the situation of the data broadcasting system prior to failure of one of its nodes is as follows. The value of the counter in the most recent data train stored by node B is 2. In node C the value is 3, and in node A the value is 4.

Node C now becomes faulty. The most recent data train to be travelling on the ring i.e. the train with the greatest count value is stored in node A.

Nodes A and B receive a state message (step 53) from the transport layer and they therefore detect that node C is faulty.

Node A looks for a new predecessor (step 59). Simultaneously, node B waits for connection with node A (step 54).

In FIG. 2, node A has now established a connection 10' with node B (step 60). After the connection has been established, node B sends over the network to node A the train 110 as most recently stored in its memory, from which data from node C has been removed, and in which the train ring description table has been updated. Its test Boolean variable is set to "true" (step 55). Node A receives the most recent data train from node B. Given the value of its counter, this train is obsolete and is not processed by node A (step 52).

Figure 3:
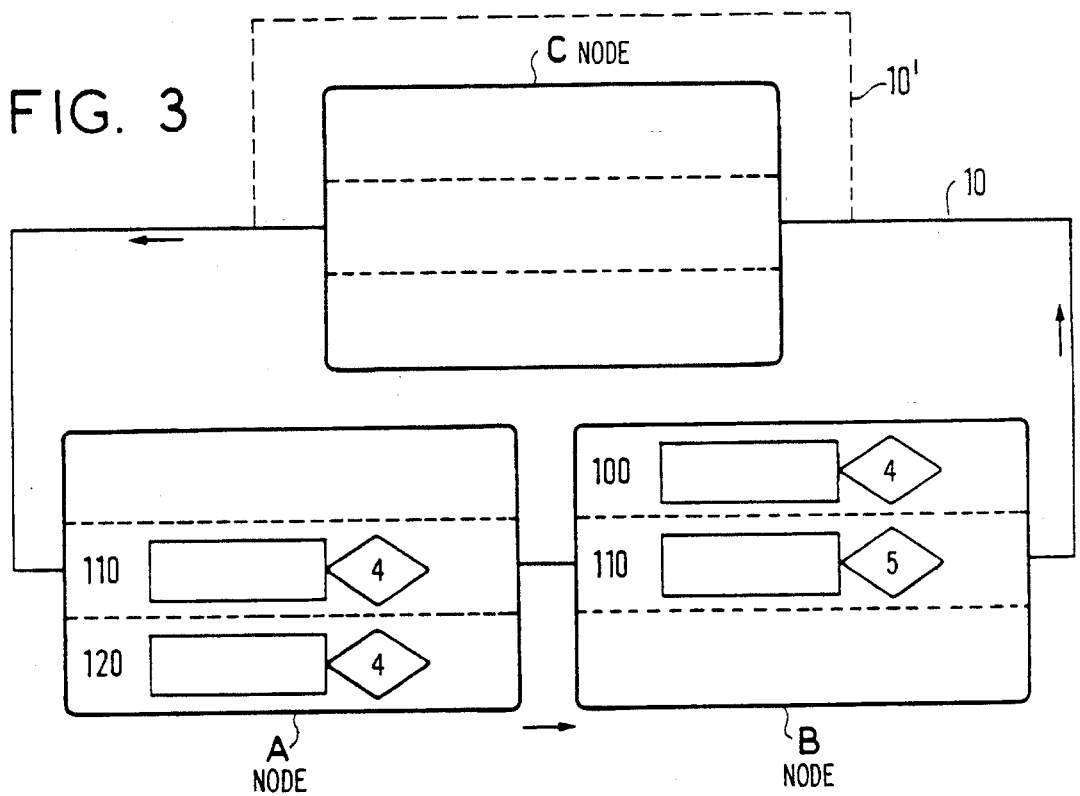
Figure 4:
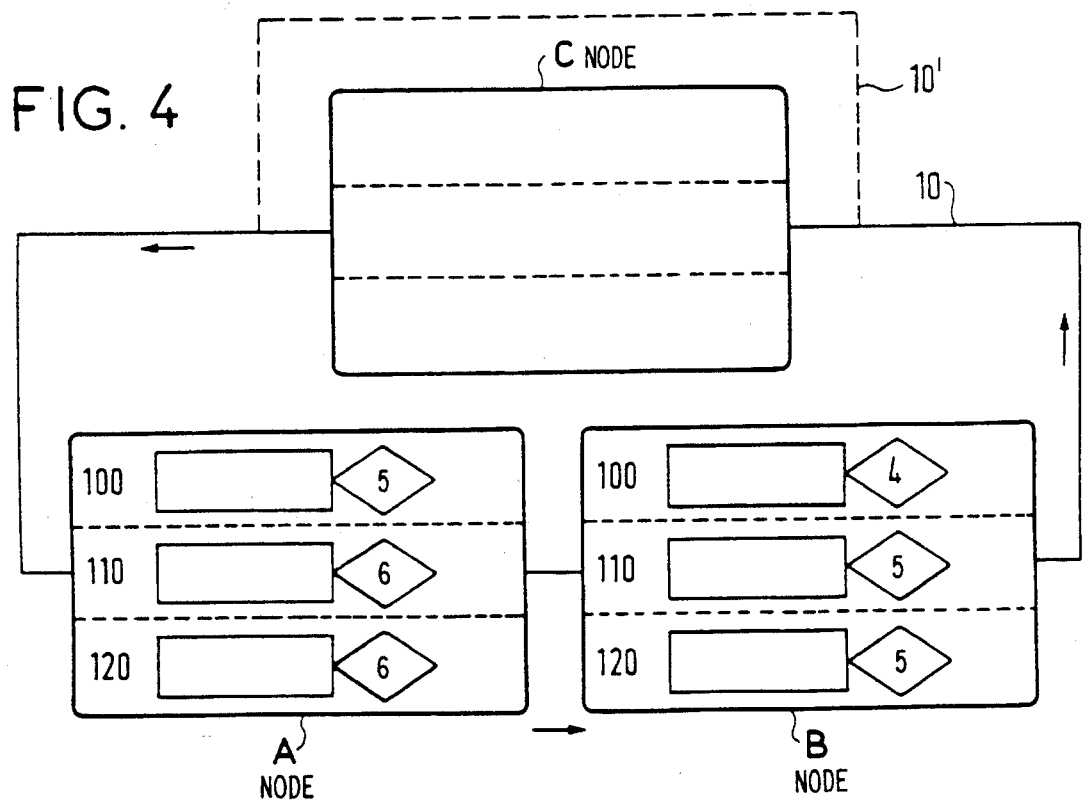

In FIG. 3, node A now sends the data train most recently stored in its memory (steps 56, 57). Node B takes account of the most recent data train sent by node A (step 52) given the value of its counter. It recovers the data from the cars in the train, and makes up a new train from which data concerning node C has been purged and having an updated train ring description table because the internal Boolean variable in node A is "true" (step 56). Thereafter in FIG. 4 node B sends over the network a new data train (step 57). Data broadcasting then takes place normally but without node C.

The fault recovery process of the invention ensures that the data train travels round working nodes in finite time. The fault recovery process is distributed amongst all of the functional nodes and it is easy to implement since the fault recovery mechanism makes decisions only on the basis of information local to each node.

The invention claimed is:

1. A method of transmitting data for a set of data processing nodes that are interconnected by a communications network and for the purpose of broadcasting data from each node to the other nodes by causing a train of such data to travel over the network around a looped circuit or ring that passes through said data processing nodes in succession in such a manner that each node in turn recovers, removes, and writes data in the train, each node having a predecessor and a successor on the ring and being capable of detecting a faulty state of its successor or of its predecessor;

wherein prior to writing new data to be broadcast in the train, each node begins by performing the steps of:
storing in an internal memory of the node the data of the train that the node has just received, including the value of a train header counter,
incrementing the value of this counter in the node's internal memory, and
dispatching the train back over the network containing new data to be broadcast and with an incremented value in the header counter; and wherein when a node detects that its predecessor on the ring is in a faulty state, the node performs the steps of:
undertaking a procedure of searching for a new predecessor on the ring,
establishing a new ring for the train,
receiving a train from its new predecessor, and
before proceeding to store in the node's internal memory the data of the train that it has just received from its new predecessor:
comparing the value of the counter in the header of the received train with the value of the same counter as stored in the node's internal memory,
dispatching over the network the train containing said new data if the value of the counter in the header of the received train is greater than the value of the counter as stored in the node's internal memory, and
waiting to receive another data train if the value of the counter in the header of the received train is not greater than the value of the counter as stored in the node's internal memory.

2. The method according to claim 1, in which whenever a particular node has detected that its predecessor is in a faulty state and has established a new ring for the train to travel, the predecessor of the faulty node dispatches over the network a train having the data and the counter value as stored in its internal memory.

\* \* \* \* \*